United States Patent
Kajmo

(10) Patent No.: US 12,247,552 B2
(45) Date of Patent: Mar. 11, 2025

(54) SYSTEM AND METHOD FOR GENERATING DIRECTIONAL FORCES IN A VEHICLE

(71) Applicant: Paul W. Kajmo, Warminster, PA (US)

(72) Inventor: Paul W. Kajmo, Warminster, PA (US)

( * ) Notice: Subject to any disclaimer, the term of this patent is extended or adjusted under 35 U.S.C. 154(b) by 0 days.

(21) Appl. No.: 18/615,526

(22) Filed: Mar. 25, 2024

(65) Prior Publication Data

US 2024/0328397 A1    Oct. 3, 2024

Related U.S. Application Data

(60) Provisional application No. 63/493,727, filed on Mar. 31, 2023.

(51) Int. Cl.
*F03G 3/08*    (2006.01)

(52) U.S. Cl.
CPC .............. *F03G 3/083* (2021.08); *F03G 3/08* (2013.01)

(58) Field of Classification Search
CPC .................................. F03G 3/083; F03G 3/08
See application file for complete search history.

(56) References Cited

U.S. PATENT DOCUMENTS

| | | |
|---|---|---|
| 2,209,832 A | 7/1940 | Schurig |
| 4,744,259 A | 5/1988 | Peterson |
| 4,784,006 A | 11/1988 | Kethley |
| 5,090,260 A * | 2/1992 | Delroy .................... G01C 19/02 74/537 |
| 8,234,943 B2 | 8/2012 | Peng et al. |
| 9,220,824 B2 | 12/2015 | Wildhirt et al. |
| 11,505,337 B1 | 11/2022 | Plemmons |
| 11,536,254 B2 | 12/2022 | Arbabian |
| 2002/0148308 A1 | 10/2002 | Rush |
| 2006/0230847 A1 | 10/2006 | Hewatt |
| 2007/0012124 A1 | 1/2007 | Perez |
| 2013/0186711 A1 | 7/2013 | Alexander |

FOREIGN PATENT DOCUMENTS

| | | |
|---|---|---|
| GB | 2 209 832 A | 5/1989 |
| GB | 2 434 784 A | 8/2007 |
| WO | WO 1996/34794 | 11/1996 |

* cited by examiner

*Primary Examiner* — Terence Boes
(74) *Attorney, Agent, or Firm* — LaMorte & Associates PC

(57) ABSTRACT

A system and method for generating gyroscopic forces. These forces can be used to propel or assist in the propulsion of a vehicle. The gyroscopic forces are generated within modules that are attached to a vehicle. Each module contains flywheel assemblies that include an axle, a flywheel, and a motor. Each axle has an angle of inclination within the module that can be selectively adjusted. Each flywheel is rotated. Once at its operational speed, the angle of inclination for each axle is altered within the module. Once the axle of a spinning flywheel is moved in inclination, gyroscopic forces are generated that act to return the flywheels to their original orientation. These gyroscopic forces can act to provide propulsion to the vehicle. Unwanted precessional forces are cancelled due to the opposed orientation of the flywheel assemblies and the equal angles of inclination.

16 Claims, 5 Drawing Sheets

SYSTEM AND METHOD FOR GENERATING DIRECTIONAL FORCES IN A VEHICLE

RELATED APPLICATIONS

This application claims the benefit of U.S. Provisional Application No. 63/493,727 filed Mar. 31, 2023.

BACKGROUND OF THE INVENTION

1. Field of the Invention

In general, the present invention relates to the structure of flywheel systems that are used to generate gyroscopic forces. More particularly, the present invention relates to flywheel systems that generate gyroscopic forces for the purpose of vehicle propulsion.

2. Prior Art Description

Flywheels are commonly used to store rotational energy. If a flywheel is mounted in a gimbal, the flywheel becomes a gyroscope. Gyroscopic systems have the ability to produce gyroscopic forces. If the flywheel in a gyroscopic system is moved to a different orientation while spinning, a gyroscopic force is created that acts to return the flywheel to its original orientation. The gyroscopic forces can be significant and can be used to produce both vertical and lateral forces. Such use of gyroscopic forces are exemplified by U.K. Patent Application No. 2,209,832 to Aspden.

A problem associated with such prior art systems is that the gyroscopic forces generated are difficult to capture and utilize for propulsion. In addition to the desired gyroscopic forces, the spinning flywheels produce unbalanced precessional forces that act to destabilize the vehicle by causing the vehicle to spin or tumble. As such, a need exists for an improved system that can use multiple flywheels to produce gyroscopic forces, can direct those gyroscopic forces in useful directions, and can balance secondary precessional forces produced by the spinning flywheels. These needs are met by the present invention as described and claimed below.

SUMMARY OF THE INVENTION

The present invention is a system and method for generating gyroscopic forces. These forces can be used to propel or assist in the propulsion of a vehicle. The gyroscopic forces are generated within modules that are attached to, or built into, a vehicle. Each module contains an even number of flywheel assemblies. Each flywheel assembly includes an axle, a flywheel, and a motor for rotating the flywheel on the axle. Furthermore, each axle has an angle of inclination within the module that can be selectively adjusted.

Within the module, each flywheel is rotated on its axle to an operational speed using the power of its motor. Once at its operational speed, the angle of inclination for each axle is altered within the module. Half of said flywheel assemblies or oriented in a first direction and are selectively inclined at a first angle. Conversely, half of the flywheel assemblies are oriented in an opposite second direction and selectively inclined at a second angle that is equal to said first angle.

Once the axle of a spinning flywheel is moved in inclination, gyroscopic forces are generated that act to return the flywheels to their original orientation. These gyroscopic forces can act to provide propulsion to the vehicle. Unwanted precessional forces are cancelled due to the opposed orientation of the flywheel assemblies and the angles of inclination.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention system and methodology can be embodied in many ways, only one exemplary embodiment is illustrated. The exemplary embodiment is being shown for the purposes of explanation and description. The exemplary embodiment is selected in order to set forth one of the best modes contemplated for the invention. The illustrated embodiment, however, is merely exemplary and should not be considered to be a limitation when interpreting the scope of the appended claims.

Figure 1:
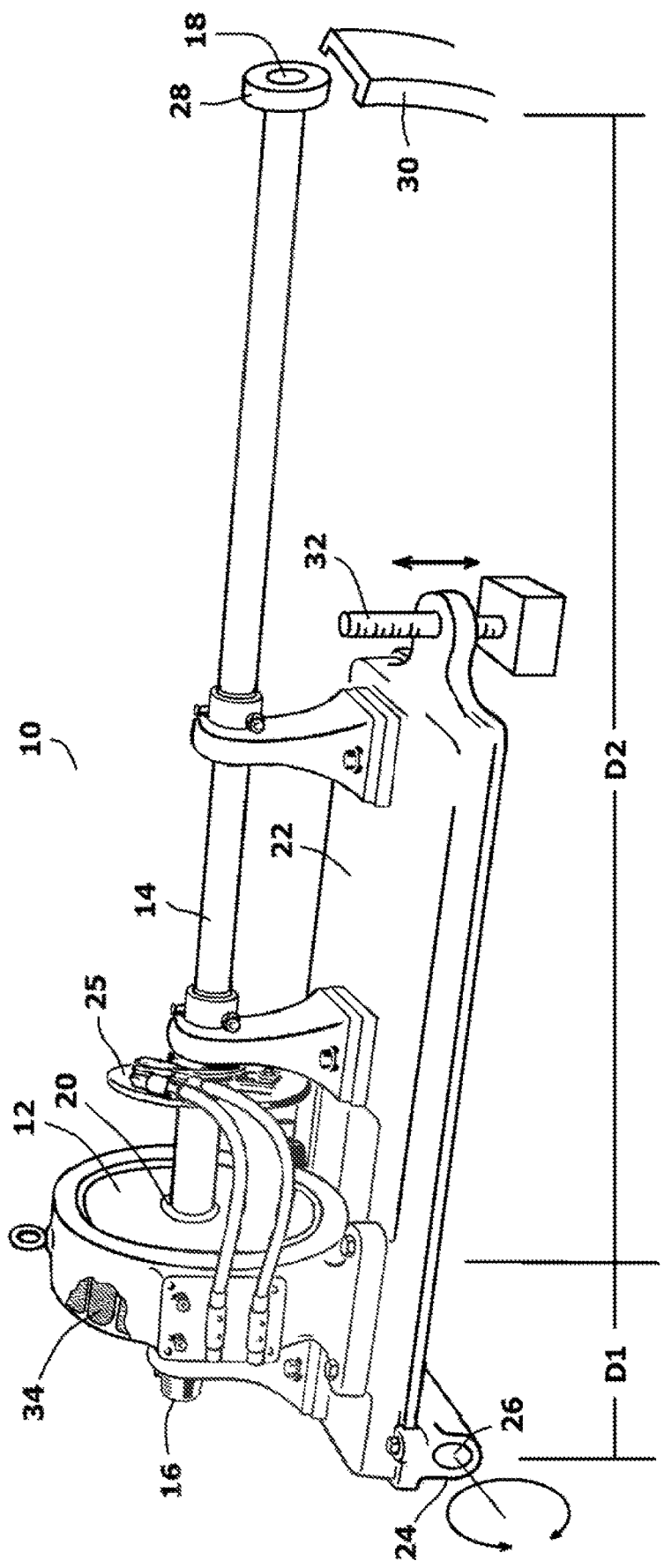
FIG. 1 is a partial cutaway of an exemplary embodiment of a flywheel assembly that generates gyroscopic forces.

Referring to FIG. 1, a gyroscopic assembly 10 is shown. The gyroscopic assembly 10 has a weighted flywheel 12 that is balanced for high speed rotation. The flywheel 12 spins about an axle 14. The axle 14 has a first end 16 and an opposite second end 18. The flywheel 12 is positioned on the axle 14 near the first end 16. The flywheel 12 has a bearing 20 that enables the flywheel 12 to rotate freely around the axle 14.

The axle 14 is disposed on a pivoting cradle 22. The pivoting cradle 22 has a first end 24 that is mounted to a pivot hinge 26. The pivot hinge 26 enables the pivoting cradle 22 and the axle 14 it holds to rotate about the pivot hinge 26 in a vertical plane. The second end 18 of the axle 14 extends from the pivoting cradle 22 and terminates with a guide bearing 28 or a functionally equivalent component. The guide bearing 28 rides in a fixed track 30 that is not part of the pivoting cradle 22. The track 30 enables the second end 18 of the axle 14 to rise and fall in an arcuate path in a vertical plane. The track 30 prohibits movement in any other direction.

The flywheel 12 is a first distance D1 from the pivot hinge 26 and a second distance D2 from the track 30. The second distance D2 is at least twice as long as the first distance D1.

A lift mechanism 32 is provided that engages the pivoting cradle 22. The lift mechanism 32 can be any form of mechanical, pneumatic, or hydraulic jack that can selectively move the pivoting cradle 22 about the pivot hinge 26, therein raising and lowering the second end 18 of the axle 14. As the lift mechanism 32 is operated, the angle of inclination of the pivoting cradle 22 and axle 14 changes. This moves the second end 18 of the axle 14 along the fixed track 30.

An electromagnetic motor 34 is provided that provides rotational energy to the flywheel 12. The electromagnet motor 34 surrounds at least part of the flywheel 12. When powered, the electromagnetic motor 34 causes the flywheel 12 to spin on the axle 14 at an operational speed. The electromagnetic motor 34 is preferably mounted on the pivoting cradle 22. In this manner, the orientation between the electromagnetic motor 34 and the flywheel 12 can remain constant as the pivoting cradle 22 changes its angle of inclination. As a result, the flywheel 12 can be maintained at a constant rate of rotation as its angle of inclination changes with the pivoting cradle 22 and axle 14.

An optional braking unit 25 can also be provided that can slow and stop the flywheel 12 during shut down or in cases of emergency.

Figure 2:
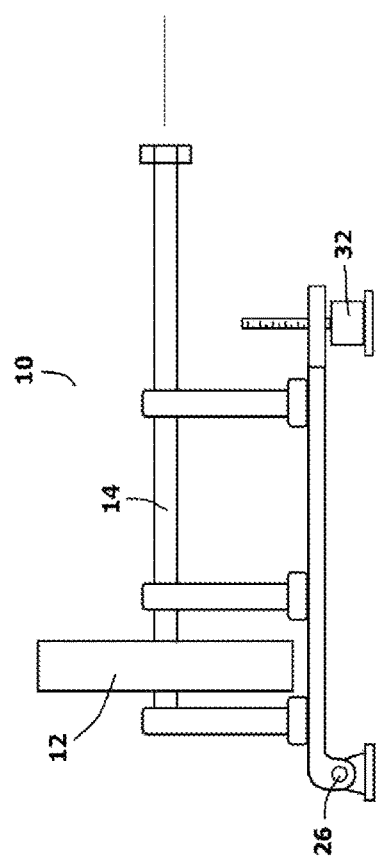
FIG. 2 is a schematic illustrating the operation of the flywheel assembly of FIG. 1 in a first orientation.
Figure 3:
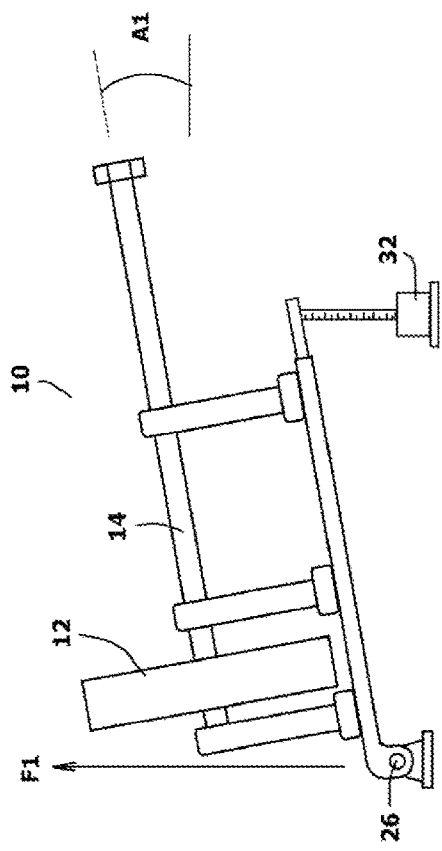
FIG. 3 is a schematic illustrating the operation of the flywheel assembly of FIG. 1 and the direction of gyroscopic forces being produced by altering the orientation from that shown in FIG. 2.

Referring to FIG. 2 and FIG. 3 in conjunction with FIG. 1, it will be understood that the flywheel 12 can be brought to its operational speed with the axle 14 in the horizontal plane. See FIG. 2. Once the flywheel 12 reaches its operational speed, the axle 14 can be inclined to an angle of inclination A1 by using the lift mechanism 32 on the pivoting cradle 22. See FIG. 3. Once the axle 14 is inclined, the gyroscopic forces F1 created by the spinning flywheel 12 act to return the axle 14 to its original horizontal orientation. Due to the fact that the pivot hinge 26 is nearest the flywheel 12, the strongest gyroscopic force F1 is experienced at the first end 16 of the axle 14. This gyroscopic force F1 acts to raise the first end 16 of the axle 14 into a horizontal orientation. Thus, an upward gyroscopic force F1 is created. In addition to the gyroscopic force F1, a precessional force is also generated.

Figure 4:
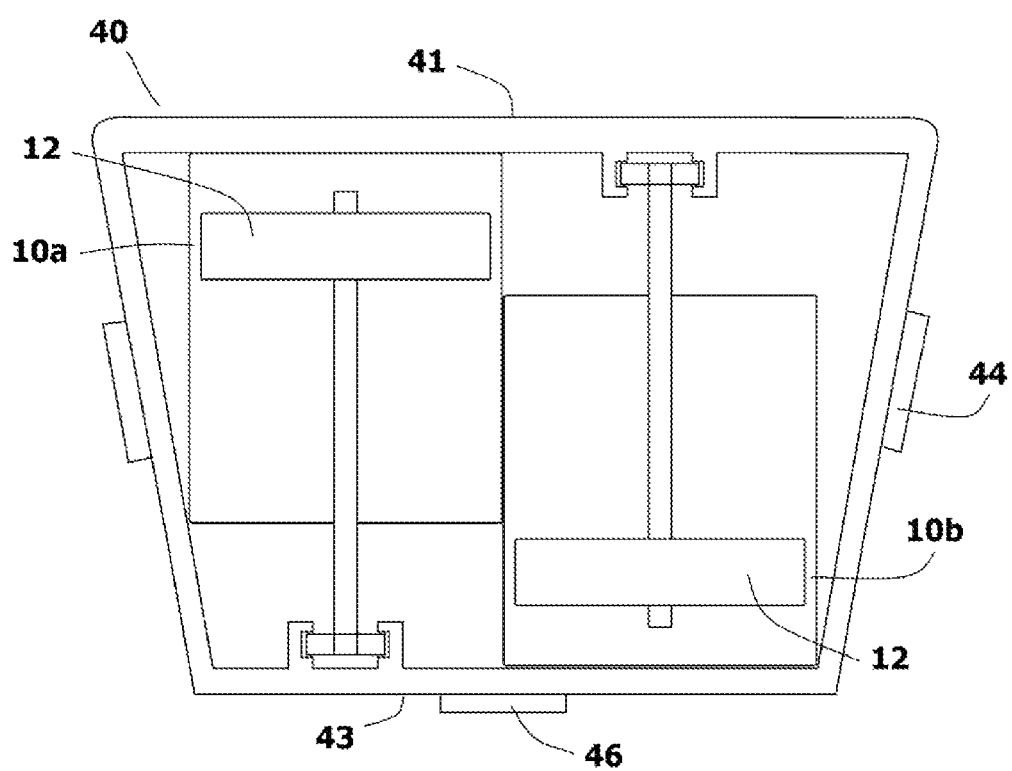
FIG. 4 is a schematic showing the position of two flywheel assemblies being mounted in a common module.

Referring to FIG. 4, it can be seen that two gyroscopic assemblies 10a, 10b are set into a module 40. The module 40 has a first side 41 and an opposite second side 43. In the module 40, the two gyroscopic assemblies 10a, 10b are offset by 180 degrees so that precessional forces are automatically cancelled. One of the gyroscopic assemblies 10a has its flywheel 12 closest to the first side 41 of the module 40. The other gyroscopic assembly 10b has its flywheel 12 closest to the opposite second side 43 of the module 40. In this opposed orientation, the precessional forces generated by one of the gyroscopic assemblies 10a, 10b in the module 40 are cancelled by the opposing precessional forces generated by the other. Accordingly, each module 40 can generate two gyroscopic forces in a common direction without any net precessional forces. Furthermore, when one cradle 22 in the module 40 is inclined, the opposite cradle 22 is inclined to the same angle.

The placement of two opposed gyroscopic assemblies 10a, 10b in a module 40 is also beneficial for mounting the gyroscopic assemblies 10a, 10b onto a vehicle. Each module 40 can have side mounts 44 for mechanical attachment and an electronic connection 46 for passing electrical power and control commands into each module 40.

Figure 5:
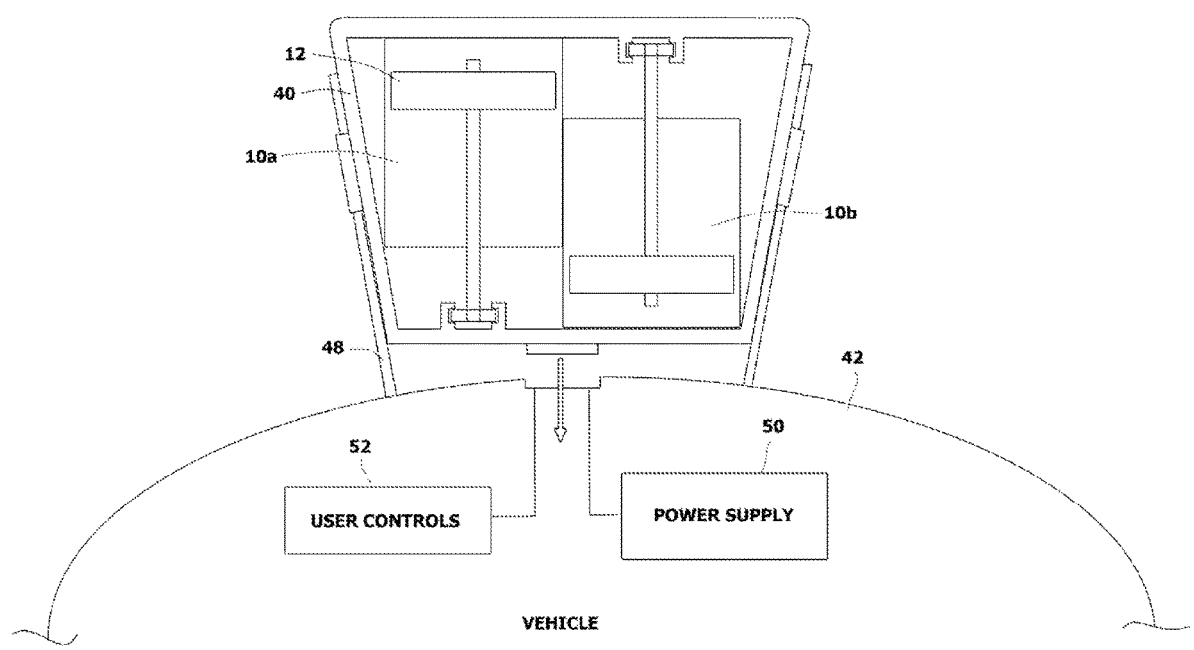
FIG. 5 shows the module of FIG. 3 mounted to a vehicle in a horizontal orientation.

Referring to FIG. 5 in conjunction with FIG. 4, it can be seen that a vehicle 42 can be provided that has mounting rails 48. The vehicle 42 can be an aircraft, spacecraft, ship, or submarine. The mounting rails 48 engage and properly position each module 40. A power supply 50 is provided inside the vehicle 42 to power the gyroscopic assemblies 10 within the modules 40. User controls 52 are also located in the vehicle 42. As such, a person or system in the vehicle 42 can control the rotational speed of the flywheels 12 and the angle of inclination for the axles 14. It will be understood that the user controls 52 of the various modules 40 can be integrated into the navigational and propulsion controls of the overall vehicle 42.

Figure 6:
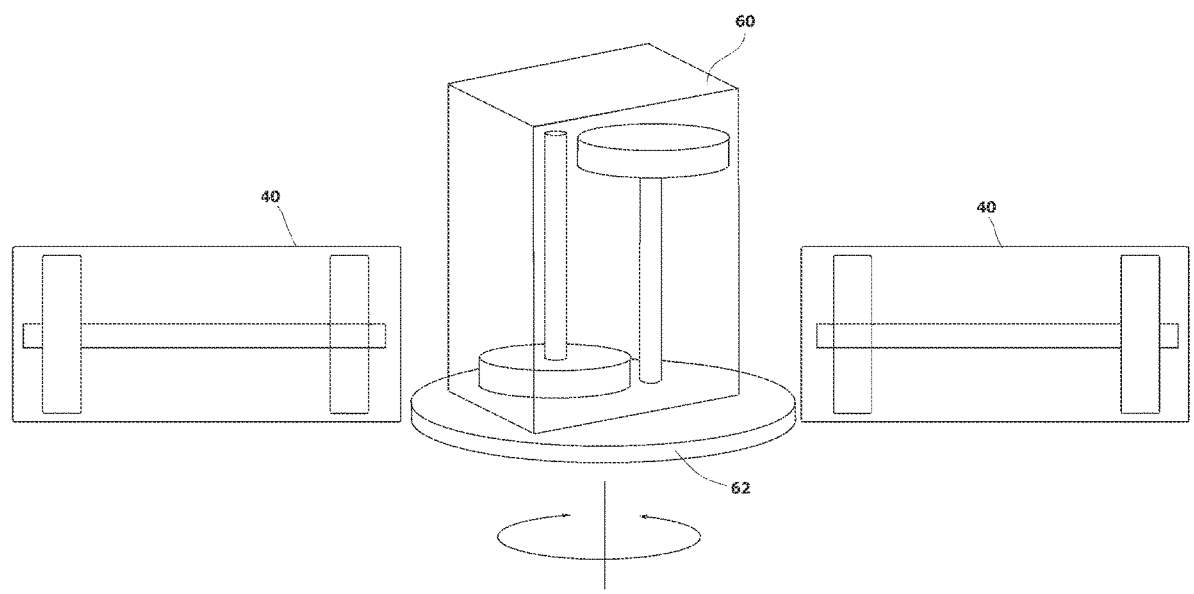
FIG. 6 shows the module of FIG. 3 mounted in both a vertical and horizontal orientation.

In the previous figures, the modules 40 have been oriented to produce gyroscopic forces in the vertical direction. However, additional modules 40 can also be utilized that produce gyroscopic forces in lateral directions. This can be accomplished by rotating the modules ninety degrees and creating one or more vertical modules. Referring to FIG. 6, it can be seen that both standard modules 40 and vertical modulars 60 are provided. The standard modules 40 can produce lift while the vertical modules 60 produce lateral gyroscopic forces. The gyroscopic forces generated by each gyroscopic assembly only act in one direction. As such, in order to produce lateral forces in more than one direction, more than one vertically module 60 would have to be used. Alternatively, one or more vertical modules 60 can be placed on rotatable control platforms 62. The control platforms 62 can be selectively rotated with the user controls 52 in the vehicle. As such, any vertical module 60 on a control platform 62 can be rotated to create a gyroscopic force in a direction that is needed. Thus, by providing modules 40, 60 in the horizontal and vertical planes, a vehicle can generate gyroscopic forces that provide both vertical lift and horizontal propulsion.

It will be understood that the embodiment of the present invention that is illustrated and described is merely exemplary and that a person skilled in the art can make many variations to that embodiment. For instance, although two flywheels are shown in each module, it will be understood that any even number of flywheels can be used. All such embodiments are intended to be included within the scope of the present invention as defined by the appended claims.

What is claimed is:

1. A gyroscopic assembly, comprising:
a module containing an even number of flywheel assemblies therein, wherein each of said flywheel assemblies includes an axle, a flywheel, and a motor for rotating said flywheel on said axle, and wherein said axle, said flywheel and said motor are mounted on a pivoting cradle that has an adjustable angle of inclination;
wherein in said module, a first half of said flywheel assemblies are oriented in a first direction and orienting a second half of said flywheel assemblies are oriented in an opposite second direction;
and
a lift mechanism for selectively altering said angle of inclination for each said pivoting cradle, wherein each said pivoting cradle in said first half of said flywheel assemblies is selectively inclined at a first angle and each said pivoting cradle in said second half of said flywheel assemblies is selectively inclined at a second angle that is equal to said first angle.

2. The assembly according to claim 1, further including a rotatable platform for rotating said module into different directions.

3. The assembly according to claim 1, wherein said module has a first side and a second side.

4. The assembly according to claim 3, wherein each said axle has a first end and an opposite second end, and wherein each said flywheel is positioned on each said axle in a position that is closer to said first end than to said second end.

5. The assembly according to claim 4, wherein each said flywheel is a first distance from said first end of each said axle and a second distance from said second end of each said axle, wherein said second distance is at least twice as long as said first distance.

6. The assembly according to claim 4, wherein said first half of said flywheel assemblies are oriented in said module with said first end of each said axle closet to said first side of said module.

7. The assembly according to claim 6, wherein said second half of said flywheel assemblies are oriented in said module with said second end of each axle closest to said second side of said module.

8. The assembly according to claim 1, wherein each said axle in said module is oriented in a plane parallel to each other said axle in said module.

9. A gyroscopic assembly, comprising:
 a plurality of modules, wherein each of said plurality of modules contains flywheel assemblies that include a first flywheel assembly and a second flywheel assembly that are oriented in opposite directions, wherein each of said flywheel assemblies includes an axle, a flywheel, and wherein each said axle has an angle of inclination that is selectively adjustable;
 motors for rotating each said flywheel to an operational speed;
 lifting mechanisms for altering said angle of inclination for each said axle, wherein said first flywheel assembly and said second flywheel assembly are selectively inclined at equal angles.

10. The assembly according to claim 9, wherein said flywheel assemblies are mounted in cradles and said lifting mechanisms selectively incline said cradles.

11. The assembly according to claim 9, further including motors mounted to said cradles that incline with said cradles.

12. The assembly according to claim 9, wherein each of said plurality of said modules has a first side and a second side.

13. The assembly according to claim 12, wherein each said axle has a first end and an opposite second end, and wherein each said flywheel is positioned on each said axle in a position that is closer to said first end than said second end.

14. The assembly according to claim 13, wherein each said flywheel is a first distance from said first end of each said axle and a second distance from said second end of each said axle, wherein said second distance is at least twice as long as said first distance.

15. The assembly according to claim 13, wherein said first flywheel assembly is oriented within one of said plurality of modules with said first end of each said axle closet to said first side.

16. The assembly according to claim 15, wherein said second flywheel assembly is oriented in one of said plurality of modules with said second end of each axle closest to said second side.

* * * * *